April 4, 1933.   W. AMES   1,903,322
MEASURING GAUGE
Filed Aug. 16, 1928
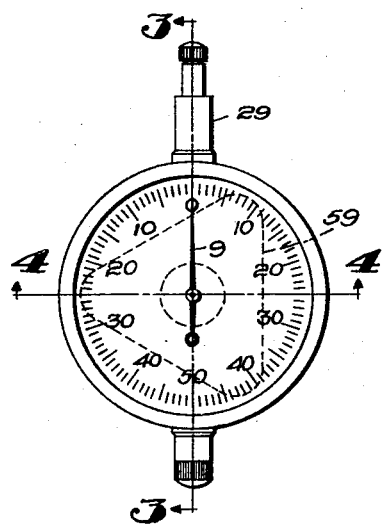
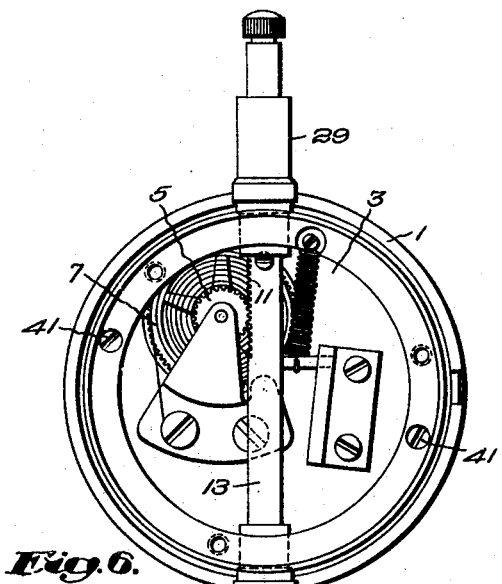
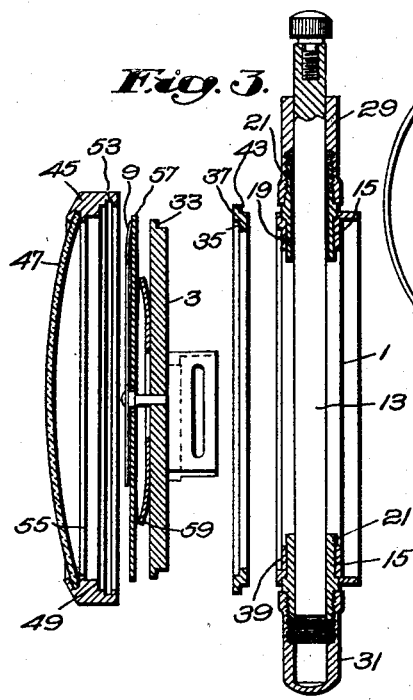
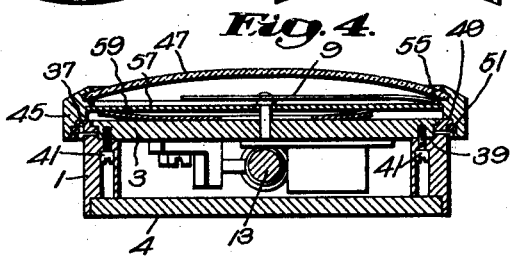
Inventor:
Warren Ames;

Patented Apr. 4, 1933

1,903,322

UNITED STATES PATENT OFFICE

WARREN AMES, OF WALTHAM, MASSACHUSETTS

MEASURING GAUGE

Application filed August 16, 1928. Serial No. 299,960.

The invention, which relates particularly but not exclusively to measuring gauges, and which has among its objects an improved mounting for the bezel and improved guiding means for the contact feeler, will be best understood from the following description when read in the light of the accompanying drawing of a specific embodiment of the invention, while the scope of the invention will be more particularly pointed out in the appended claims.

In the drawing:

Fig. 1 is a plan view of a measuring gauge constructed according to the invention;
Fig. 2 is a bottom view on an enlarged scale with the back plate of the instrument removed;

Fig. 3 is a section on the line 3—3 of Fig. 1 with the bezel and cooperating parts of the gauge disassembled;

Fig. 4 is a section on the line 4—4 of Fig. 1; and

Figs. 5, 6 and 7 show details on an enlarged scale of the gauge according to Figs. 1 to 4.
Referring to the drawing, the gauge is illustrated as having a casing which comprises a ring like member 1, closed at opposite sides respectively by removable front and back plates 3 and 4, the front plate 3 having mounted thereon mechanism including the gears 5 and 7 for actuating the indicating hand 9. As shown, the gear 5 meshes with rack teeth 11 formed on a reciprocatory contact rod 13 extending substantially diametrically of the casing.

As shown, the casing 1 at opposite sides thereof is provided with perforations 15 (Figs. 3 and 7) the outer portions of which are counterbored to form shoulders 17 at right angles to the axes of the perforations. In each perforation is inserted a shank 19 of a nipple 21, the nipples being formed with shoulders 23 which abut with the shoulders 17 so as to insure that the screw threaded portions 25 of the nipples will be accurately centered with the axes of the perforations. The rod 13 loosely fits the bore 27 of the upper nipple as shown in Fig. 3, while removably screw threaded on the nipple is a guide bearing sleeve 29 for the rod. The lower end of the rod as viewed in Fig. 3 slidingly fits the lower nipple 21, which latter therefore serves as a guide bearing sleeve for the lower end of the rod. As shown, the lower nipple or guide bearing sleeve 21 has screwed thereon a dust cap 31.

Heretofore the guide bearing sleeve 29 has been formed integrally with the casing, or as a separate piece fixedly secured to the casing. In practice dust and dirt work into the interior of the sleeve 29, and by making the sleeve removable, the cooperating parts of the rod and sleeve may be readily cleaned, and worn sleeves 29 replaced.

As shown, the front plate 3 about its periphery is formed to provide a shoulder 33 which engages with the shoulder 35 formed on a rotatable ring 37 when the parts are assembled, the casing being recessed as shown at 39 (Figs. 3 and 4) for receiving the front plate and centering it with the casing, while the front plate is removably secured to the casing by screws 41.

The side of the ring 37 opposite the shoulder 35 is provided with a second shoulder 43, while the bezel 45 which carries the crystal 47 is recessed to provide a shoulder 49 (Figs. 3 and 4) for receiving the ring 37. After the parts are assembled as shown in Fig. 4, a resilient split ring 51 (Figs. 4 and 6) is snapped into a groove 53 formed in the recessed portion of the bezel which receives the ring 37 and thereby secures the latter to the bezel. The bezel is further provided with a shoulder portion 55 against which the peripheral portion of the dial 57 abuts. The flat spring 59 between the dial and the front plate 3 is compressed when the bezel is placed over the ring 37 and acts to hold the dial in frictional engagement with the shoulder 55 of the bezel so that when the bezel is rotated the dial must rotate with it, rotation of the bezel being permitted due to the ring 37 being rotatably secured to the casing.

It will be noticed that in the device illustrated, the ring 37 throughout its periphery has an unbroken bearing on the front plate against which bearing it is held by the spring 59, thus providing a durable, smoothly acting mounting for the rotatable bezel. It will also be noted that the connection between the bezel and the ring 37 afforded by the removable split ring 51 permits the bezel easily to be detached from the instrument for cleaning of the associated parts without the necessity of removing the back plate as heretofore has been necessary.

It will be understood that wide deviations may be made for the submitted embodiment of the invention without departing from the spirit of the invention.

I claim:

1. An instrument of the character described having in combination, a casing, a ring member, a bezel, a dial rotatable with said bezel, the latter having an annular recess for receiving the outer portion of said ring member, means for securing said outer portion of said ring member to said bezel, and a part secured to said casing having a portion thereof overlying the inner portion of said ring member for rotatably securing the later to said casing.

2. An instrument of the character described having in combination, a casing, a ring member, a bezel, a dial rotatable with said bezel, the latter having an annular recess for receiving the outer portion of said ring member, means comprising a split resilient ring in said recess for securing said outer portion of said ring member to said bezel, and a part secured to said casing having a portion thereof overlying the inner portion of said ring member for rotatably securing the latter to said casing.

3. An instrument of the character described having, in combination, a casing, a ring member, a bezel, the latter having an annular recess receiving the outer portion of said ring member, means for securing said outer portion of said ring member to said bezel, a part having a portion thereof overlying the inner portion of said ring member in rotatable contact therewith substantially throughout its circumference, said part being secured to said casing, said bezel surrounding a dial and having abutment means engaging the peripheral portion of said dial, and spring means between said casing and dial for holding the latter in frictional contact with said abutment means for causing said dial to rotate with said bezel.

4. An instrument of the character described having, in combination, a casing, a ring member, a bezel, the latter having an annular recess receiving the outer portion of said ring member, means comprising a split resilient ring in said recess for securing said outer portion of said ring member to said bezel, a part having a portion thereof overlying the inner portion of said ring member in rotatable contact therewith substantially throughout its circumference, said part being secured to said casing, said bezel having an internal annular shoulder facing toward said casing, a dial having the peripheral portion thereof in contact with said shoulder, and spring means between said part and said dial for forcing the latter into frictional contact with said shoulder whereby to cause said dial to rotate with said bezel and to hold said ring member in contact with said overlying portion of said part.

5. An instrument of the character described having, in combination, a casing, a ring member rotatably mounted on said casing, a bezel secured to said ring member, a dial the outer face of which at the peripheral portion thereof contacts with cooperating radially extending surface portions of said bezel, and spring means for urging said dial toward said surface portions of said bezel for holding said dial in contact therewith and for urging said bezel with said ring away from said casing.

6. An instrument of the character described having, in combination, a casing, a ring member, a bezel secured to said ring member, a dial the outer face of which at the peripheral portion thereof contacts with cooperating radially extending surface portions of said bezel, a part secured to said casing having a radially extending surface throughout its circumference cooperating with a like surface on said ring member, and spring means engaging said dial for urging the latter with said bezel and ring member away from said casing whereby said dial is frictionally secured to said bezel and said ring member is held frictionally against said part.

7. An instrument of the character described having, in combination, a casing, indicator mechanism comprising a reciprocating rack and a rack gear meshing therewith, said casing having an opening and a perforated screw-threaded nipple projecting exteriorly from said casing and aligned with said opening, said rack having a rod extending through said opening and nipple in spaced relation to the walls thereof, and an elongated guide bearing sleeve for said rod in screw-threaded engagement with said nipple.

8. An instrument of the character described having, in combination, a casing, a nipple, said nipple carried by said casing at the exterior thereof, said nipple being exteriorly screw threaded and having a longitudinal perforation opening to the interior of said casing, a contact feeler rod in said casing projecting through said perforation of said nipple in spaced relation to the walls thereof, and an elongated guide bearing sleeve for said rod screw threaded on said nipple.

9. An instrument of the character described having, in combination, a casing having an opening, a reciprocating contact feeler rod projecting from said casing through said opening in spaced relation to the walls thereof, an elongated guide bearing sleeve for said rod wholly outside of said casing, and means for detachably and rigidly connecting said bearing sleeve to said casing adjacent said opening.

10. An instrument of the character described having, in combination, a casing having openings at opposite sides thereof in the casing walls, a reciprocating contact feeler rod projecting from said casing at opposite sides thereof through said openings, said rod contacting with the walls of one of said openings but being spaced from the walls of the other opening, an elongated guide bearing sleeve for said rod, and means for detachably and rigidly connecting said bearing sleeve to said casing adjacent the last mentioned opening.

11. An instrument of the character described having, in combination, a casing having an opening in the walls thereof, a reciprocating contact feeler rod in said casing projecting therefrom through said opening in spaced relation to the walls of said opening, guide bearing means for said rod adjacent the side of said casing opposite said opening, an elongated guide bearing sleeve for said rod at the exterior of said casing, and means for detachably and rigidly connecting said bearing sleeve to said casing about said opening in alignment with said guide bearing means.

12. An instrument of the character described having, in combination, a casing having an opening in the walls thereof, an axially perforated nipple received by said opening, said nipple having a screw threaded portion, a reciprocating contact feeler rod in said casing extending through the perforation of said nipple in spaced relation to the walls of said perforation, a guide bearing sleeve for said rod removably screw-threaded on said nipple, said nipple and casing formed with cooperating surfaces for centering said sleeve coaxially of said rod.

13. An instrument of the character described having, in combination, a casing having an opening in the walls thereof, an axially perforated nipple received by said opening, said nipple having a screw threaded portion, a reciprocating contact feeler rod in said casing extending through the perforation of said nipple in spaced relation to the walls of said perforation, a guide bearing sleeve for said rod removably screw-threaded on said nipple, means forming a guide bearing for said rod spaced from said sleeve toward the opposite side of the casing therefrom, said nipple and casing formed with cooperating surfaces for centering said sleeve coaxially with said guide bearing.

14. An instrument of the character described having, in combination, a casing having aligned openings in the opposite walls thereof, a reciprocating contact feeler rod projecting into said openings, a guide bearing sleeve for said rod in one of said openings, an axially perforated nipple, said nipple permanently received in the other of said openings and having a screw-threaded portion at the exterior of said casing, a guide bearing sleeve for said rod removably screw-threaded on said nipple, said nipple and casing formed with cooperating surfaces for centering the bore of the last mentioned sleeve coaxially with the bore of the first mentioned sleeve.

In testimony whereof, I have signed my name to this specification.

WARREN AMES.